US008631317B2

(12) United States Patent
Kangas et al.

(10) Patent No.: US 8,631,317 B2
(45) Date of Patent: Jan. 14, 2014

(54) MANIPULATING DISPLAY OF DOCUMENT PAGES ON A TOUCHSCREEN COMPUTING DEVICE

(75) Inventors: Paul D. Kangas, Raleigh, NC (US); Daniel M. Ranck, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/170,336

(22) Filed: Jun. 28, 2011

(65) Prior Publication Data

US 2013/0007612 A1 Jan. 3, 2013

(51) Int. Cl.
*G06F 17/24* (2006.01)

(52) U.S. Cl.
USPC ........................................ 715/227

(58) Field of Classification Search
USPC ........................................ 715/227
See application file for complete search history.

(56) References Cited

U.S. PATENT DOCUMENTS

| | | | |
|---|---|---|---|
| 5,809,267 A | 9/1998 | Moran et al. | |
| 8,086,971 B2* | 12/2011 | Radivojevic et al. | 715/863 |
| 8,171,404 B2* | 5/2012 | Borchers et al. | 715/272 |
| 2008/0201650 A1 | 8/2008 | Lemay et al. | |
| 2009/0083229 A1* | 3/2009 | Gupta | 707/3 |
| 2009/0178008 A1 | 7/2009 | Herz et al. | |
| 2010/0207892 A1 | 8/2010 | Lin et al. | |
| 2010/0235735 A1 | 9/2010 | Ording et al. | |
| 2010/0333044 A1 | 12/2010 | Kethireddy | |
| 2011/0069016 A1* | 3/2011 | Victor | 345/173 |

OTHER PUBLICATIONS

IBM, "Navigation Control and Gesture Recognition Input Device for Small, Portable User Interfaces", IP.com prior art database, Jun. 11, 2004, ip.com, USA.
Shannon et al., "Gestures for Human Interface Devices", IP.com prior art database, Jun. 8, 2010, Synaptics Incorporated, Santa Clara CA, USA.

* cited by examiner

*Primary Examiner* — Doug Hutton, Jr.
*Assistant Examiner* — Tionna Smith
(74) *Attorney, Agent, or Firm* — H. Barrett Spraggins; Katherine S. Brown; Biggers Kennedy Lenart Spraggins LLP (57) ABSTRACT

Methods, apparatuses, and computer program products for manipulating display of document pages on a touchscreen computing device are provided. Embodiments include recognizing, by the touchscreen computing device, finger motion selection gestures on a touchscreen of the touchscreen computing device; selecting, by the touchscreen computing device for each recognized finger motion selection gesture, a document page displayed on the touchscreen; recognizing, by the touchscreen computing device, a finger motion combination gesture on the touchscreen; combining, by the touchscreen computing device responsive to the finger motion combination gesture, the selected document pages into a single concatenated document page; and displaying, by the touchscreen computing device, the single concatenated document page.

17 Claims, 11 Drawing Sheets

Finger Motion
Overlap Gesture
428

MANIPULATING DISPLAY OF DOCUMENT PAGES ON A TOUCHSCREEN COMPUTING DEVICE

BACKGROUND OF THE INVENTION

1. Field of the Invention

The field of the invention is data processing, or, more specifically, methods, apparatuses, and computer program products for manipulating display of document pages on a touchscreen computing device.

2. Description of Related Art

As portable electronic devices become more compact, a significant problem is the ability of the devices to display document pages on a small screen size. Furthermore, switching from one document page to another often requires changing image resolution. That is, viewing document pages on a small screen is often a time consuming and tedious task.

SUMMARY OF THE INVENTION

Methods, apparatuses, and computer program products for manipulating display of document pages on a touchscreen computing device are provided. Embodiments include recognizing, by the touchscreen computing device, finger motion selection gestures on a touchscreen of the touchscreen computing device; selecting, by the touchscreen computing device for each recognized finger motion selection gesture, a document page displayed on the touchscreen; recognizing, by the touchscreen computing device, a finger motion combination gesture on the touchscreen; combining, by the touchscreen computing device responsive to the finger motion combination gesture, the selected document pages into a single concatenated document page; and displaying, by the touchscreen computing device, the single concatenated document page.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for manipulating display of document pages on a touchscreen computing device in accordance with the present invention are described with reference to the accompanying drawings, beginning with FIG. 1.

Figure 1:
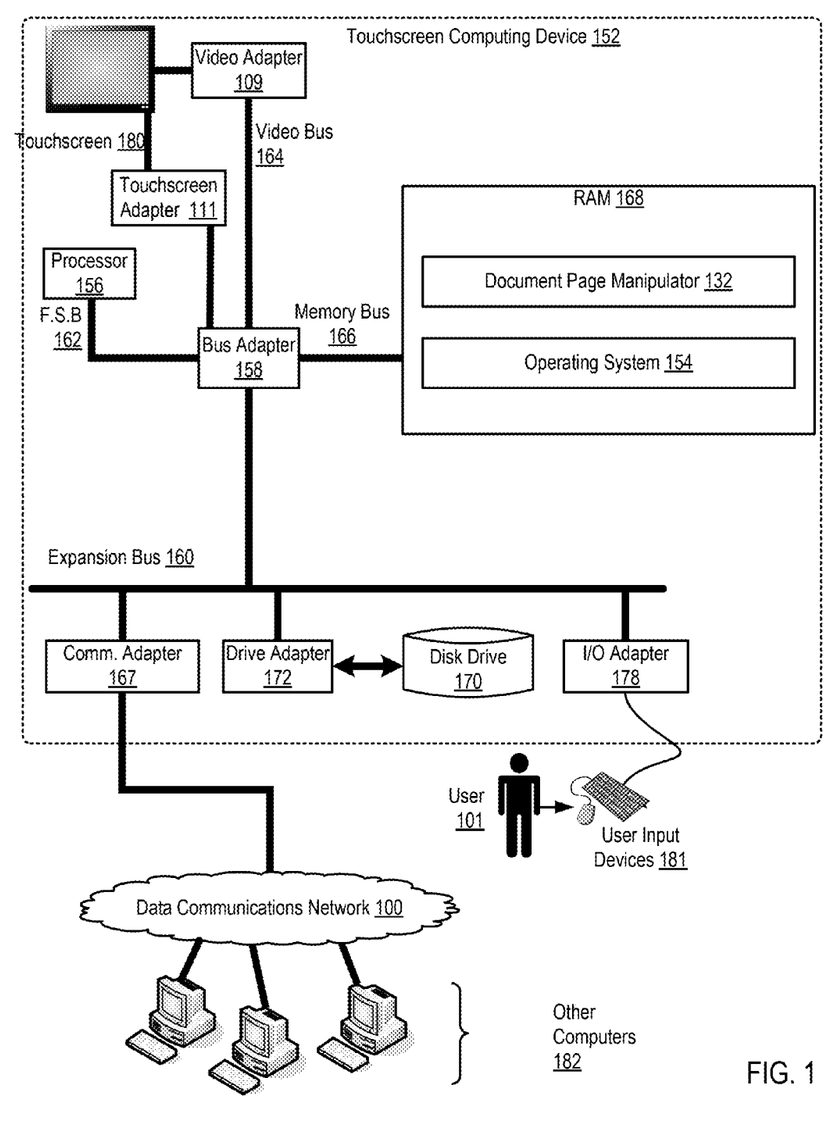
FIG. 1 sets forth a block diagram of automated computing machinery forming a system for manipulating display of document pages on a touchscreen computing device according to embodiments of the present invention.

FIG. 1 sets forth a block diagram of automated computing machinery forming a system for manipulating display of document pages on a touchscreen computing device according to embodiments of the present invention. The system of FIG. 1 includes an exemplary computer (152) useful in manipulating display of document pages on a touchscreen computing device according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a document page manipulator (132). A document page manipulator is an application that manipulates the display of document pages on a touchscreen (180) of the touchscreen computing device (152). A document as the term is used in this specification refers to any type of electronic document. Examples of documents include pdf files, word documents, and others as will occur to readers of skill in the art. The document page manipulator (132) of FIG. 1 includes computer program instructions that when executed by the processor (156) cause the processor (156) to recognize finger motion selection gestures on a touchscreen (180) of the touchscreen computing device (152); select, for each recognized finger motion selection gesture, a document page displayed on the touchscreen (180); recognize a finger motion combination gesture on the touchscreen (180); combine, responsive to the finger motion combination gesture, the selected document pages into a single concatenated document page; and display the single concatenated document page.

Also stored in RAM (168) is an operating system (154). Operating systems that support manipulating display of document pages on a touchscreen computing device according to embodiments of the present invention include UNIX™, Linux™, Microsoft XP™, AIX™, IBM's i5/OS™, and others as will occur to those of skill in the art. The operating system (154) and the document page manipulator (132) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support manipulating display of document pages on a touchscreen computing device according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a touchscreen (180) such as a display screen that includes a touchscreen adapter (111) for translating touches to the screen to commands. A touchscreen is an electronic visual display that can detect the presence and location of a touch within the display area. The term generally refers to touching the display of the device with a finger or hand. Touchscreens can also sense other passive objects, such as a stylus. Touchscreens are common in devices such as all-in-one computers, tablet computers, and smartphones. A touchscreen enables a user to interact directly with what is displayed, rather than indirectly with a pointer controlled by a mouse or touchpad. Secondly, a touchscreen lets a user do so without requiring any intermediate device that would need to be held in the hand. Touchscreens can be attached to computers, or to networks as terminals. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support manipulating display of document pages on a touchscreen computing device according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2A:
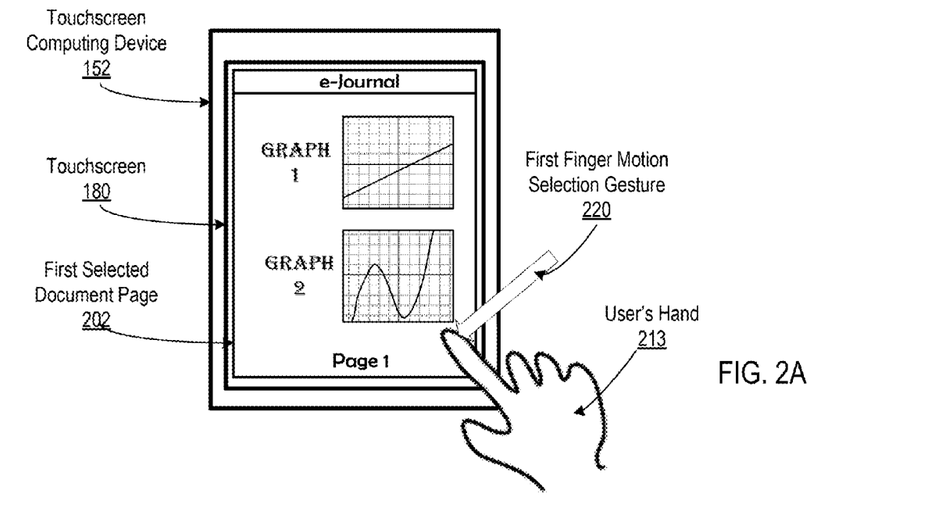
FIGS. 2A, 2B, 2C, and 2D set forth diagrams illustrating an exemplary method for manipulating display of document pages on a touchscreen computing device according to embodiments of the present invention.

FIGS. 2A, 2B, 2C, and 2D set forth diagrams illustrating an exemplary method for manipulating display of document pages on a touchscreen computing device according to embodiments of the present invention. FIG. 2A includes the touchscreen computing device (152) of FIG. 1 displaying a first document page (202) of an electronic journal (e-Journal). The document pages of the electronic journal may be displayed using an electronic reader application executing on the touchscreen computing device. A document page may include text, images, or any other type of data capable of being displayed on the touchscreen computing device and may be part of any type of document that occurs to one of skill in the art. In addition to displaying document pages of the electronic journal, the touchscreen computing device (152) is configured to recognize finger motion selection gestures on the touchscreen (180). A finger motion selection gesture is a finger motion gesture that indicates a selection of a document page. A finger motion gesture may include any type of finger motion and involve any number of fingers. The finger motion selection gesture (220) of FIG. 2A involves a user pressing and holding continuously a finger of the user's hand (213) onto the surface of the touchscreen (180).

The touchscreen computing device (152) of FIG. 2A is also configured to select, for each recognized finger motion selection gesture, a document page displayed on the touchscreen. In the example of FIG. 2A, the first finger motion selection gesture (220) is performed when the first document page (202) of the electronic journal is displayed on the touchscreen (180), thus selecting the first document page (202).

The touchscreen computing device (152) of FIG. 2A is also configured to recognize any number of other types of finger motion gestures while the user continues to perform the finger motion selection gesture (220). For example, while the user is pressing and holding a finger to select a page, if a user swipes a finger from left to right, the next page of the electronic journal may be displayed on the touchscreen (180).

Figure 2B:
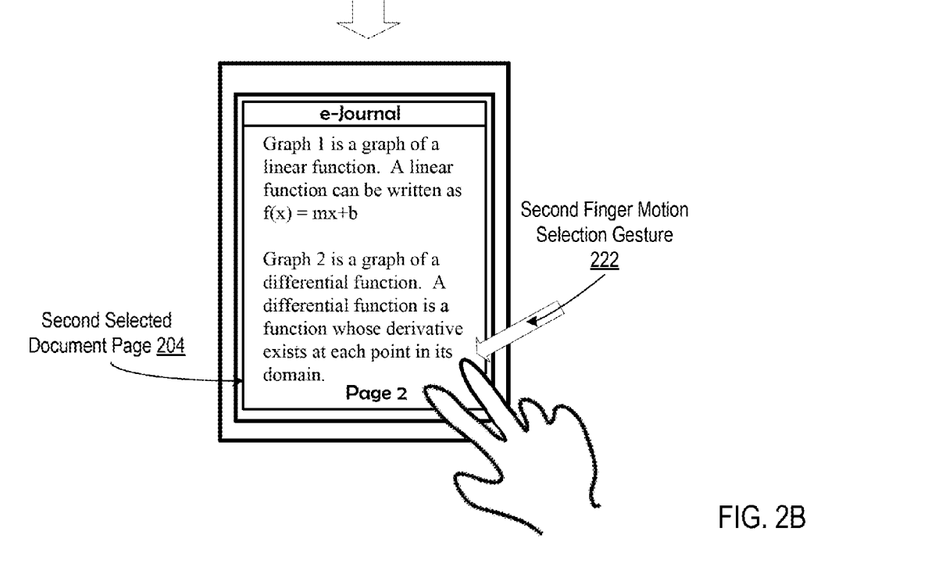

In FIG. 2B, a second document page (204) is displayed on the touchscreen (180) of the touchscreen computing device (152). In the example of FIG. 2B, the user's hand (213) is performing a second finger motion selection gesture (222). The second finger motion selection gesture (222) of FIG. 2B involves a user pressing a second finger of the user's hand (213) onto the surface of the touchscreen (180) while continuing to press the first finger on the touchscreen (180). Responsive to the second finger motion selection gesture (222), the touchscreen computing device (152) selects the second document page (204).

Figure 2C:
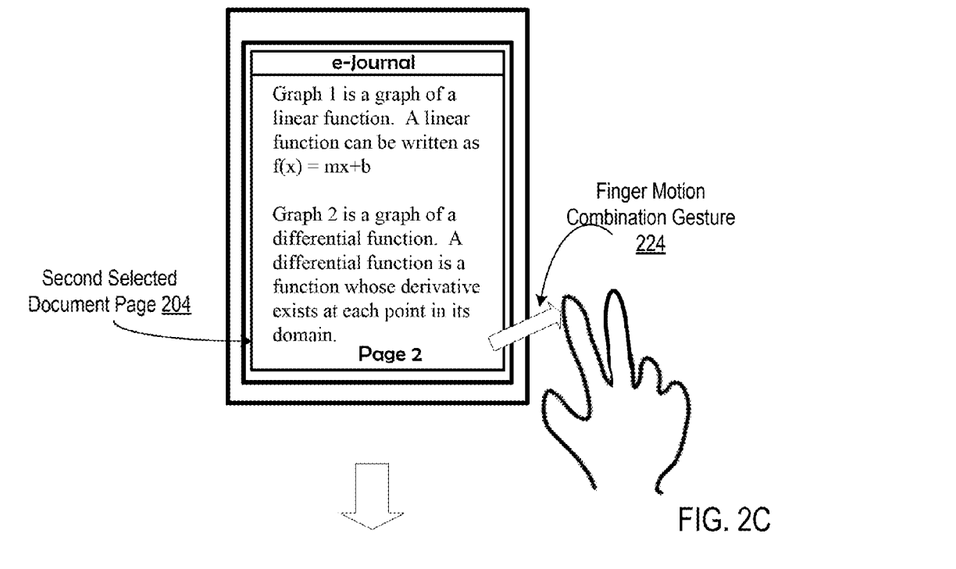

The touchscreen computing device (152) is also configured to recognize a finger motion combination gesture. A finger motion combination gesture is a finger motion gesture that indicates that the user desires the touchscreen computing device (152) to combine all of the selected document pages into a single concatenated document page for display on the touchscreen (180). In the example of FIG. 2C, the user's hand (213) is illustrated performing a finger motion combination gesture (224). The finger motion combination gesture (224) of FIG. 2C involves two fingers of the user's hand (213) lifting simultaneously. In FIG. 2C, two fingers are used because two document pages were previously selected (see FIGS. 2A and 2B). However, if three document pages were selected, three fingers lifting simultaneously may indicate the finger motion combination gesture. Although the finger motion combination gesture is described as involving 'simultaneously lifting fingers,' any finger gesture could be used to indicate a finger motion combination gesture.

The touchscreen computing device (152) is also configured to combine, responsive to the finger motion combination gesture, the selected document pages into a single concatenated document page. A single concatenated document page is a document page that includes all of the selected document pages. The touchscreen computing device may be configured to perform functions on a single concatenated document page as if the single concatenated document page were a single document page. That is, the touchscreen computing device (152) may scroll and move the single concatenated document page without flipping between document pages. When the touchscreen computing device (152) is viewing a single concatenated document page, portions of multiple selected document pages may be viewed concurrently.

Figure 2D:
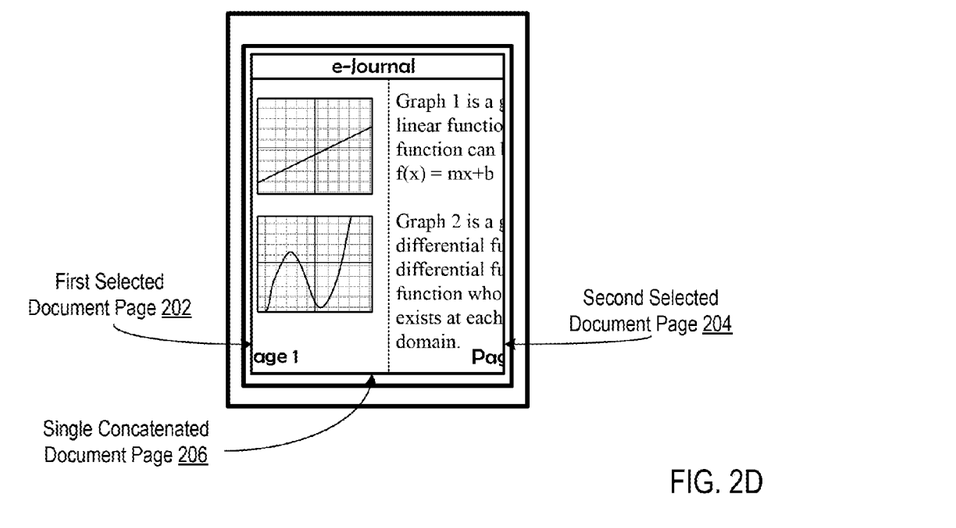

FIG. 2D illustrates the touchscreen computing device (152) displaying a single concatenated document page (206) after combining the first selected document page (202) and the second selected document page (204). In the example of FIG. 2D, a portion of the first selected document page (202) and a portion of the second selected document page (204) is viewable at the same time on the touchscreen (180). Furthermore, additional finger motion gestures are not required to maintain concurrent viewing of both selected document pages. That is, the touchscreen (180) continues to display both selected document pages without the user's hand (213) pressing or touching the touchscreen (180). In addition, the zoom level that was selected for viewing the first selected document page (202) and the second selected document page (204) is applied to viewing the single concatenated document page. That is, a user of the touchscreen computing device (152) does not have to change the zoom level when switching to display of the single concatenated document page. However, the touchscreen computing device (152) may be configured to present to the user the option of changing the zoom level of selected document pages or the single concatenated document page (206). That is, the selected document pages and the single concatenated document page (206) may have different user configurable zoom settings.

Figure 3A:
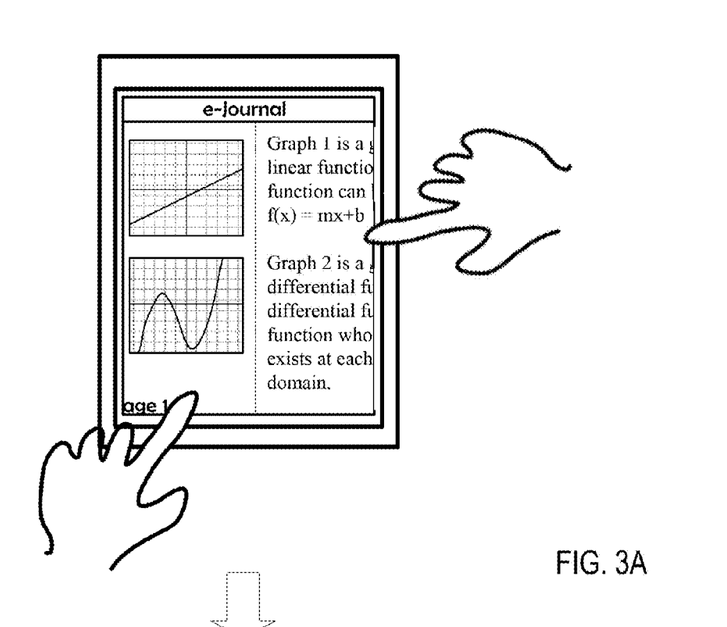
FIGS. 3A and 3B set forth diagrams illustrating a further exemplary method for manipulating display of document pages on a touchscreen computing device according to embodiments of the present invention.
Figure 3B:
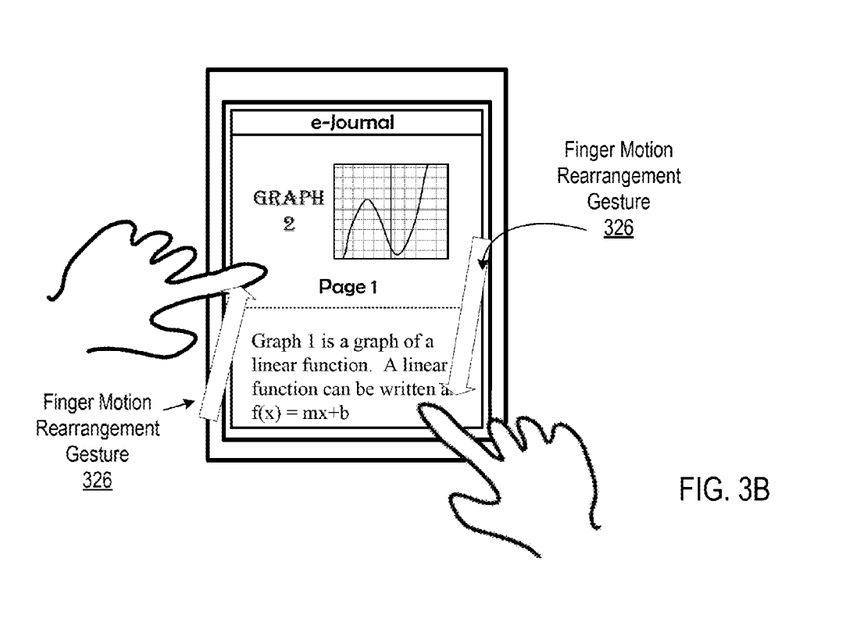

FIGS. 3A and 3B set forth diagrams illustrating a further exemplary method for manipulating display of document pages on a touchscreen computing device according to embodiments of the present invention. The touchscreen computing device (152) of FIG. 3 is configured to recognize a finger motion rearrangement gesture on a touchscreen. A finger motion rearrangement gesture is a finger motion gesture that indicates that the user desires the touchscreen computing device (152) to rearrange positions of the selected documents relative to each other within a single concatenated document page. In the example of FIGS. 3A and 3B, the user's hands are illustrated performing a finger motion rearrangement gesture (326). The finger motion rearrangement gesture (326) of FIGS. 3A and 3B involves, as illustrated in FIG. 3A, the user pressing one finger on an area of the touchscreen displaying the first document page (202) and pressing another finger on an area of the touchscreen displaying the second document page (204). In FIG. 3B, the user moves the right hand and left hand in opposite directions. In response to this movement, the touchscreen computing device (152) moves the selected document pages to new positions within the single concatenated document page as indicated by the finger positions in FIG. 3B. That is, instead of the first document page (202) and the second document page (204) having side-by-side positions within the single concatenated document page as in FIG. 3A, the touchscreen computing device (152) as in FIG. 3B, moved the first selected document page (202) into a position above the second selected document page (204).

Figure 4A:
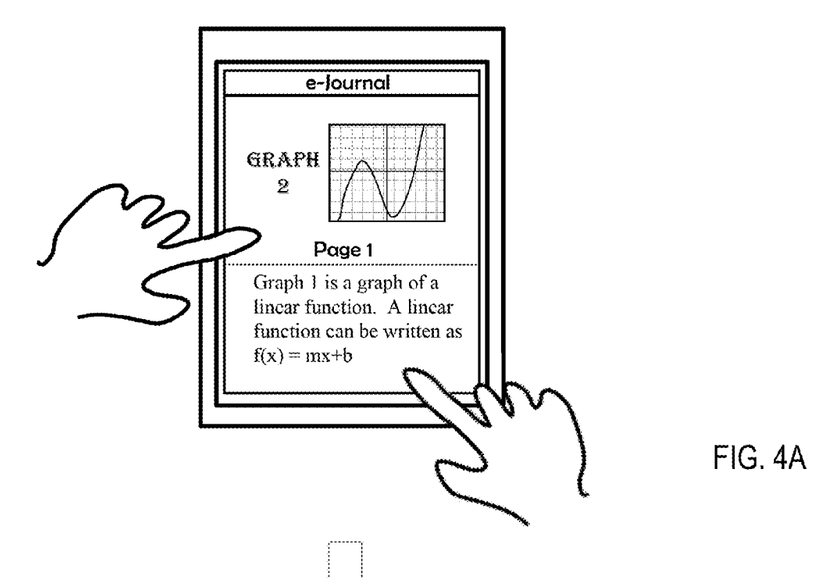
FIGS. 4A and 4B set forth diagrams illustrating a further exemplary method for manipulating display of document pages on a touchscreen computing device according to embodiments of the present invention.
Figure 4B:
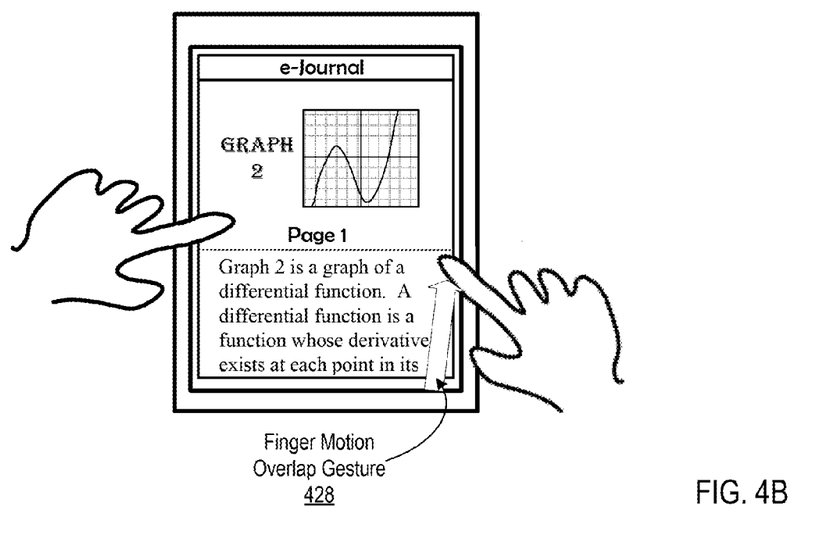

FIGS. 4A and 4B set forth diagrams illustrating a further exemplary method for manipulating display of document pages on a touchscreen computing device according to embodiments of the present invention. The touchscreen computing device (152) of FIG. 4 is configured to recognize a finger motion overlap gesture on a touchscreen. A finger motion overlap gesture is a finger motion gesture that indicates that the user desires the touchscreen computing device (152) to overlap one of the selected document pages over at least one of the other selected document pages. In the example of FIGS. 4A and 4B, the user's hands are illustrated performing a finger motion overlap gesture (428). The finger motion overlap gesture (428) of FIGS. 4A and 4B involves, as illustrated in FIG. 4A, the user initially pressing one finger on an area of the touchscreen displaying the first document page (202) and then pressing another finger on an area of the touchscreen displaying the second document page (204). Because the area of the touchscreen corresponding to the first selected document page (202) was pressed first, the first selected document page (202) is set as a 'foreground page' and the second selected document page (204) is set as a 'background page.' In the example of FIG. 4, foreground pages overlap background pages. Thus, as illustrated in FIG. 4B, as the user moves the finger corresponding to the second selected document page (204), the second selected document page (204) scrolls underneath the first selected document page (202).

Figure 5A:
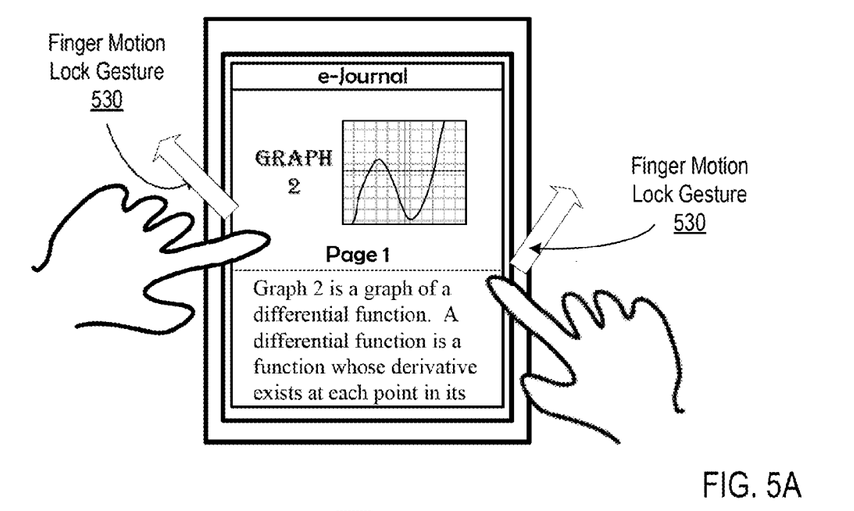
FIGS. 5A and 5B set forth diagrams illustrating a further exemplary method for manipulating display of document pages on a touchscreen computing device according to embodiments of the present invention.
Figure 5B:
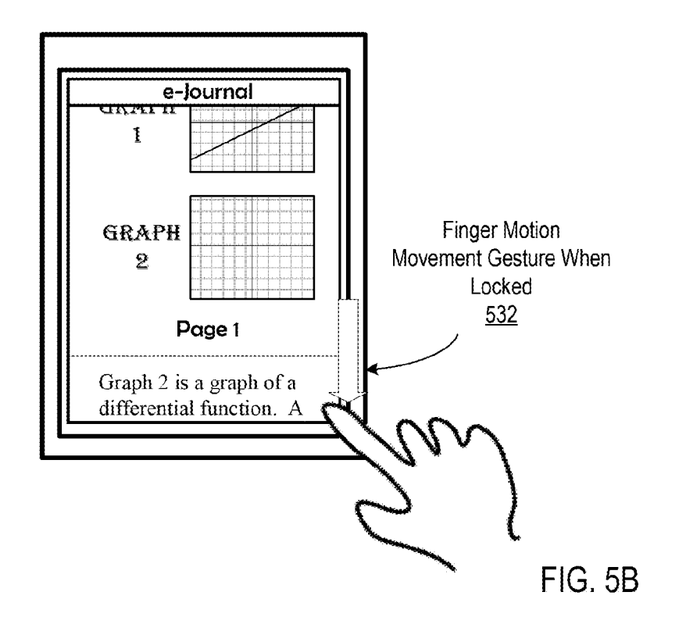

FIGS. 5A and 5B set forth diagrams illustrating a further exemplary method for manipulating display of document pages on a touchscreen computing device according to embodiments of the present invention. The touchscreen computing device (152) of FIG. 5 is configured to recognize a finger motion lock gesture on a touchscreen. A finger motion lock gesture is a finger motion gesture that indicates that the user desires the touchscreen computing device (152) to lock positions of the selected document pages within a single concatenated document page. In the example of FIG. 5A, the user's hands are illustrated performing a finger motion lock gesture (530). The finger motion lock gesture (530) of FIG. 5A involves the user lifting all of the fingers that are touching the touchscreen (180) off of the touchscreen. Responsive to recognizing the finger motion lock gesture (530), the touchscreen computing device (152) locks the positions of the selected document pages within the single concatenated document page (206). That is, if the user moves the single concatenated document page (206) when the positions of the selected document pages are locked, all of the selected document pages will move in unison.

FIG. 5B illustrates the user moving the single concatenated document page when the positions of the selected document pages are locked. The touchscreen computing device (152) of FIG. 5 is configured to recognize a finger motion movement gesture on a touchscreen. A finger motion movement gesture is a finger motion gesture that indicates that the user desires the touchscreen computing device (152) to move one of more of the selected document pages. In the example of FIG. 5B, the user's hand is illustrated performing a finger motion movement gesture (532). The finger motion movement gesture (532) of FIG. 5B involves the user pressing and sliding one finger along the touchscreen. In response to recognition of the finger motion movement gesture when the position of the selected document pages are locked, the touchscreen computing device (152) moves the single concatenated document page (206). That is, all of the selected document pages within the single concatenated document page move in unison. In the example of FIG. 5B, both the first selected document page (202) and the second selected document page (204) move upwards in response to a finger moving upwards along the touchscreen.

Figure 6:
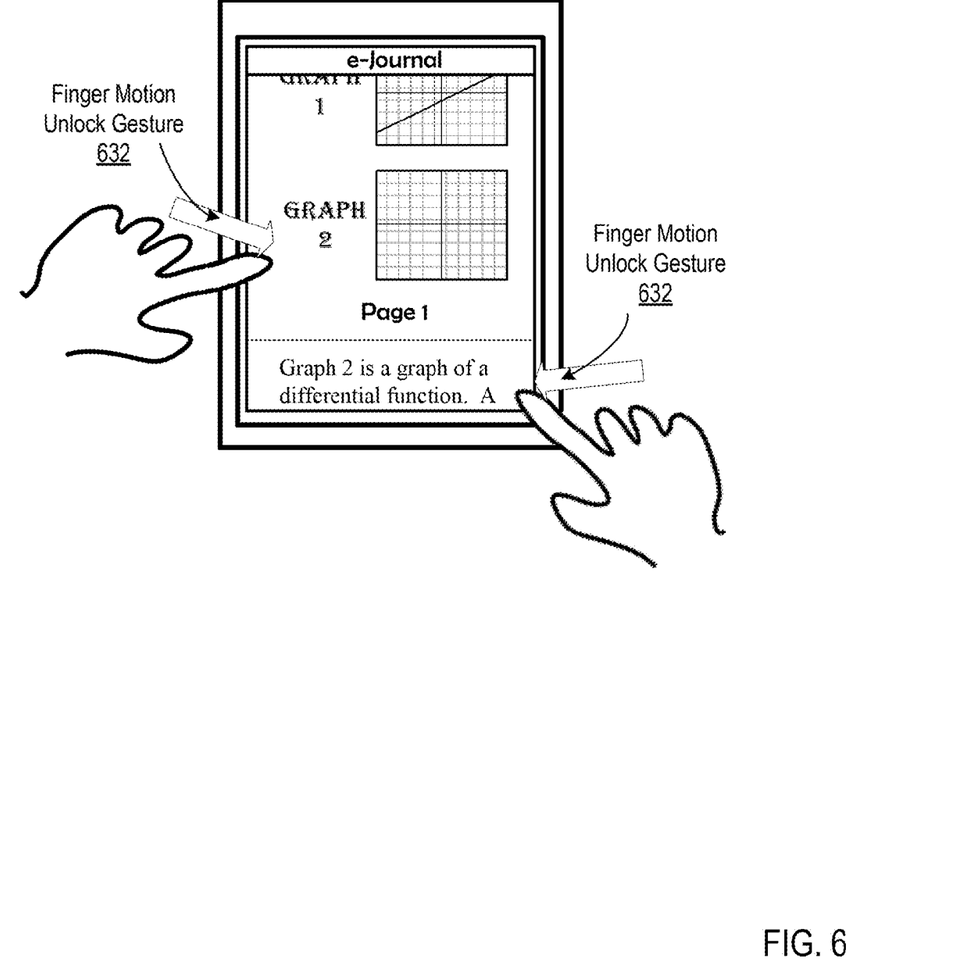
FIG. 6 sets forth diagrams illustrating a further exemplary method for manipulating display of document pages on a touchscreen computing device according to embodiments of the present invention.

FIG. 6 set forth diagrams illustrating a further exemplary method for manipulating display of document pages on a touchscreen computing device according to embodiments of the present invention. The touchscreen computing device (152) of FIG. 6 is configured to recognize a finger motion unlock gesture on a touchscreen.

A finger motion unlock gesture is a finger motion gesture that indicates that the user desires the touchscreen computing device (152) to unlock positions of the selected document pages within a single concatenated document page. In the example of FIG. 6, the user's hands are illustrated performing a finger motion unlock gesture (632). The finger motion unlock gesture (632) of FIG. 6 involves the user placing a first finger on an area of the touchscreen (180) that is displaying the first document page (202) and placing a second finger on an area of the touchscreen (180) displaying the second document page (204).

Responsive to recognizing the finger motion unlock gesture (632), the touchscreen computing device (152) unlocks the positions of the selected document pages within the single concatenated document pages. That is, if the user moves the single concatenated document page when the positions of the selected document pages are unlocked, such as during a finger motion overlap gesture (428) of FIGS. 4A and 4B, only the selected document page displayed on the portion of the touchscreen corresponding with the finger motion overlap gesture will move while the remaining selected documents remain in position. That is, the touchscreen computing device (152) unlocks the positions of the document pages when a user places a finger on each document page of at least two different document pages displayed within a single concatenated document page. A user can then lock the positions of the document pages by lifting, sequentially or simultaneously, the fingers placed on each selected document page. If the positions of the selected document pages are locked, then the selected document pages become a single concatenated document page that can be panned and zoom and if the positions of the selected document pages are unlocked, then the positions of the selected document pages can be re-overlapped or rejoined in a new configuration. The touchscreen computing device (152) is configured to store data indicating the positions of the selected document pages such that upon unlocking the positions of the selected documents, the touchscreen computing device (152) can use the data to rearrange and reposition the selected document pages within the single concatenated document page.

Figure 7:
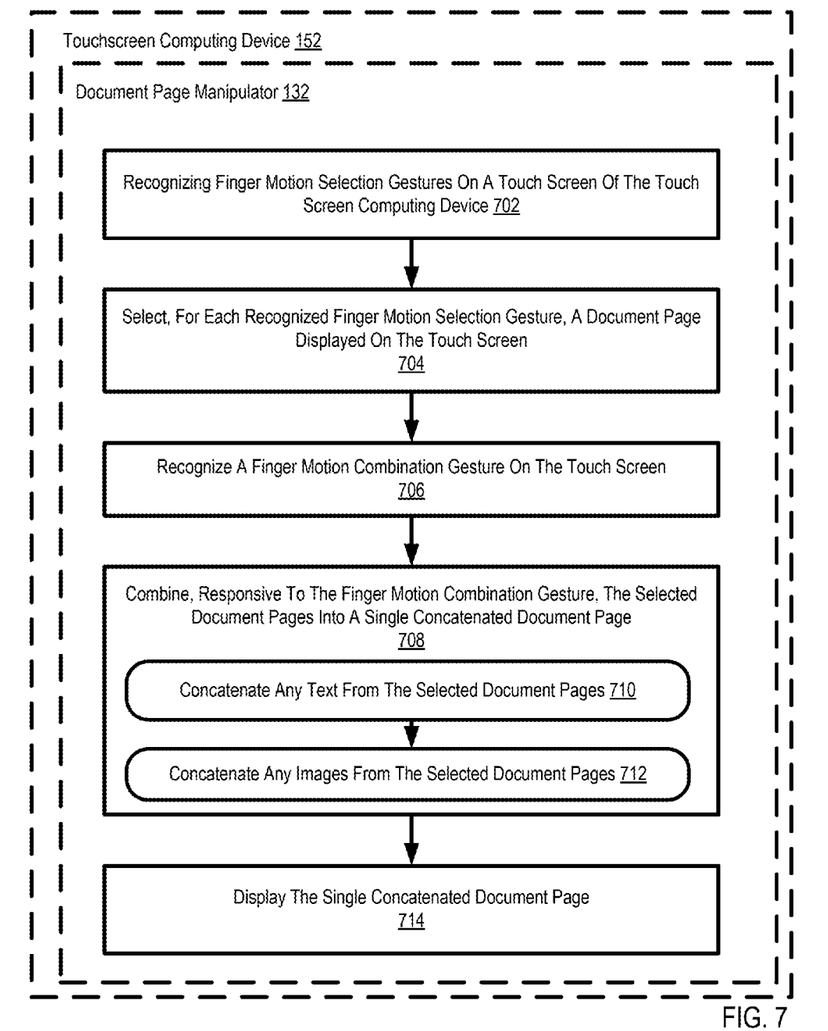
FIG. 7 sets forth a flow chart illustrating a further exemplary method for manipulating display of document pages on a touchscreen computing device according to embodiments of the present invention.

FIG. 7 sets forth a flow chart illustrating a further exemplary method for manipulating display of document pages on a touchscreen computing device according to embodiments of the present invention. The method of FIG. 7 includes recognizing (702), by the touchscreen computing device (152), finger motion selection gestures on a touchscreen of the touchscreen computing device (152).

Recognizing (702) finger motion selection gestures on a touchscreen of the touchscreen computing device (152) may be carried out by monitoring a sensing field within the touchscreen; detecting touches by detecting changes in pressure within the sensing field; differentiating the amount of pressures; and detecting finger motion gestures based on the pressure and touch information.

The method of FIG. 7 also includes selecting (704), by the touchscreen computing device (152) for each recognized finger motion selection gesture, a document page displayed on the touchscreen. Selecting (704) for each recognized finger motion selection gesture, a document page displayed on the touchscreen may be carried out by storing in memory an indication of which document pages are selected and which are not selected.

The method of FIG. 7 includes recognizing (706), by the touchscreen computing device (152), a finger motion combination gesture on the touchscreen. Recognizing (706) a finger motion combination gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 7 includes combining (708), by the touchscreen computing device (152) responsive to the finger motion combination gesture, the selected document pages into a single concatenated document page. Combining (708) responsive to the finger motion combination gesture, the selected document pages into a single concatenated document page may be carried out by determining which selected document pages are selected and forming the selected document pages into a single concatenated document page.

In the method of FIG. 7, combining (708), responsive to the finger motion combination gesture, the selected document pages into a single concatenated document page may optionally include concatenating (710) any text from the selected document pages. Concatenating (710) any text from the selected document pages may be carried out by performing text recognition on all of the selected document pages and combining the text into a single document page. The combined text may be searchable and capable of being 'cut and paste' as a single text block. That is, a user may cut and paste text from multiple selected document pages as if the text was from the same document page.

In the method of FIG. 7, combining (708), responsive to the finger motion combination gesture, the selected document pages into a single concatenated document page may optionally include concatenating (712) any images from the selected document pages. Concatenating (712) any images from the selected document pages may be carried out by performing image recognition on all of the selected document pages and combining the images into a single document page. The combined images may be searchable and capable of being 'cut and paste' as a single group of images. That is, a user may cut and paste images from multiple selected document pages as if the images were from the same document page.

The method of FIG. 7 also includes displaying, by the touchscreen computing device, the single concatenated document page. Displaying the single concatenated document page may be carried out by transmitting images for display on the touchscreen of the touchscreen computing device (152).

Figure 8:
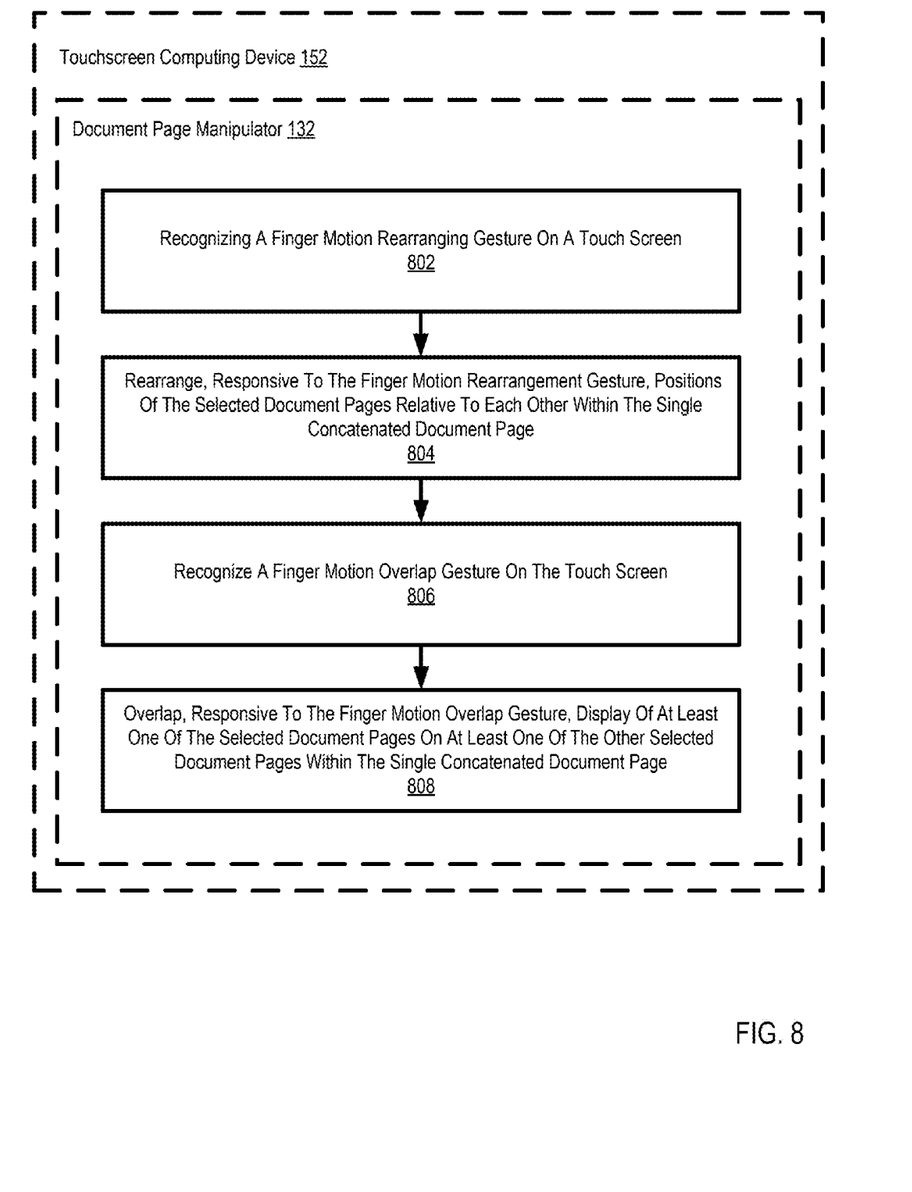
FIG. 8 sets forth a flow chart illustrating a further exemplary method for manipulating display of document pages on a touchscreen computing device according to embodiments of the present invention.

FIG. 8 sets forth a flow chart illustrating a further exemplary method for manipulating display of document pages on a touchscreen computing device according to embodiments of the present invention. The method of FIG. 8 includes recognizing (802), by the touchscreen computing device (152), a finger motion rearrangement gesture on the touchscreen. Recognizing (802) a finger motion rearrangement gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 8 also includes rearranging (804), by the touchscreen computing device (152) responsive to the finger motion rearrangement gesture, positions of the selected document pages relative to each other within the single concatenated document page. Rearranging (804) responsive to the finger motion rearrangement gesture, positions of the selected document pages relative to each other within the single concatenated document page may be carried out by identifying initial locations of fingers on the touch pad; corresponding the initial finger locations to selected document pages; determining the new finger locations; and corresponding the new finger locations with new positions and arrangements of the selected document pages.

The method of FIG. 8 includes recognizing (806), by the touchscreen computing device (152), a finger motion overlap gesture on the touchscreen. Recognizing (806) a finger motion overlap gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 8 also includes overlapping (808), by the touchscreen computing device (152) responsive to the finger motion overlap gesture, display of at least one of the selected document pages on at least one of the other selected document pages within the single concatenated document page. Overlapping (808) responsive to the finger motion overlap gesture, display of at least one of the selected document pages on at least one of the other selected document pages within the single concatenated document page may be carried out by identifying initial locations of fingers on the touch pad; corresponding the initial finger locations to selected document pages; determining the new finger locations; and corresponding the new finger locations with new positions and arrangements of the selected document pages.

Figure 9:
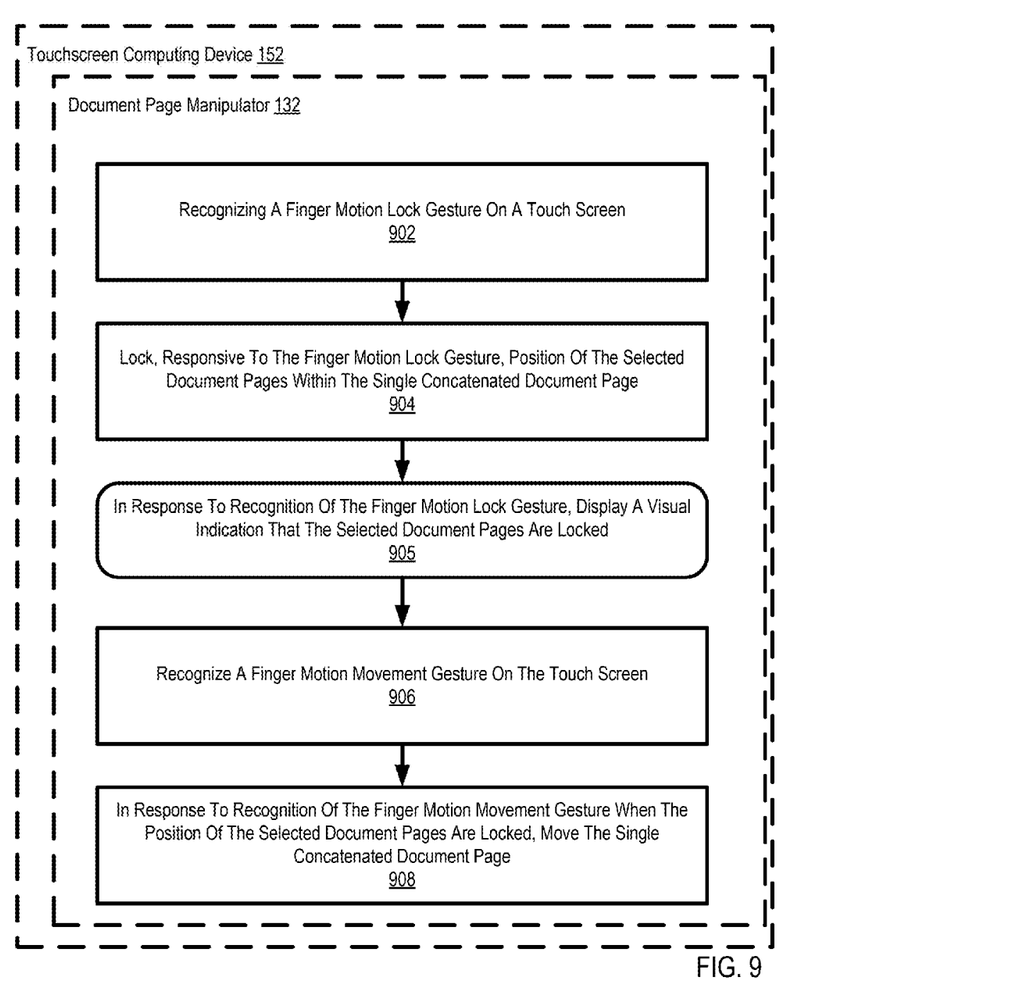
FIG. 9 sets forth a flow chart illustrating a further exemplary method for manipulating display of document pages on a touchscreen computing device according to embodiments of the present invention.

FIG. 9 sets forth a flow chart illustrating a further exemplary method for manipulating display of document pages on a touchscreen computing device according to embodiments of the present invention. The method of FIG. 9 includes (902) recognizing, by the touchscreen computing device (152), a finger motion lock gesture on the touchscreen. Recognizing a finger motion lock gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 9 includes locking (904), by the touchscreen computing device (152) responsive to the finger motion lock gesture, position of the selected document pages within the single concatenated document page. Locking (904) responsive to the finger motion lock gesture, position of the selected document pages within the single concatenated document page may be carried out by storing one or more variables indicating that the positions of the selected document pages are locked.

The method of FIG. 9 includes recognizing (906), by the touchscreen computing device (152), a finger motion movement gesture on the touchscreen. Recognizing (906) a finger motion movement gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 9 includes in response to recognition of the finger motion movement gesture when the position of the selected document pages are locked, moving (908), by the touchscreen computing device (152), the single concatenated document page. Moving (908) the single concatenated document page may be carried out by changing the position of each selected document page in unison such that the entire single concatenated document page moves together in display on the touchscreen.

The method of FIG. 9 optionally includes in response to recognition of the finger motion lock gesture, displaying, by the touchscreen computing device, a visual indication that the selected document pages are locked. Displaying a visual indication that the selected document pages are locked may be carried out by flashing one or more LEDs or lights of the touchscreen; displaying an icon somewhere on the touchscreen, providing a popup message, or any other type of indications as would occur to one of skill in the art.

Figure 10:
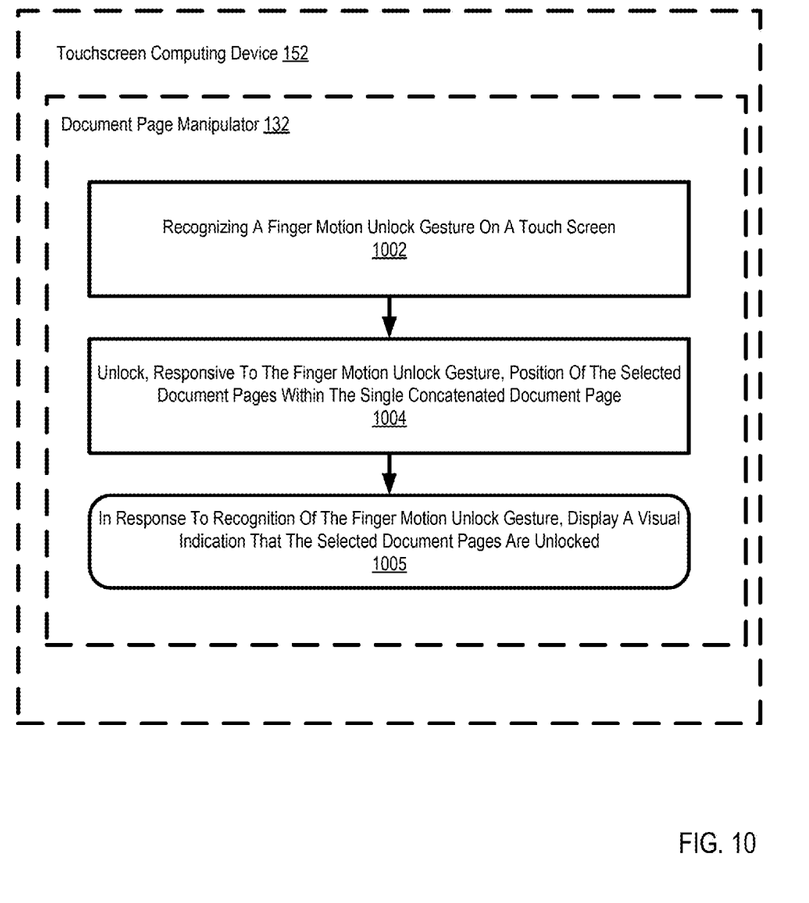
FIG. 10 sets forth a flow chart illustrating a further exemplary method for manipulating display of document pages on a touchscreen computing device according to embodiments of the present invention.

FIG. 10 sets forth a flow chart illustrating a further exemplary method for manipulating display of document pages on a touchscreen computing device according to embodiments of the present invention. The method of FIG. 10 includes recognizing (1002), by the touchscreen computing device (152), a finger motion unlock gesture on the touchscreen. Recognizing (1002) a finger motion unlock gesture on the touchscreen may be carried out by monitoring a sensing field within the touchscreen; detecting touches by detecting changes in pressure within the sensing field; differentiating the amount of pressures; and detecting finger motion gestures based on the pressure and touch information.

The method of FIG. 10 includes unlocking (1004), by the touchscreen computing device responsive to the finger motion unlock gesture, position of the selected document pages within the single concatenated document page. Unlocking (1004), responsive to the finger motion unlock gesture, position of the selected document pages within the single concatenated document page may be carried out by storing one or more variables indicating that the positions of the selected document pages are unlocked.

The method of FIG. 10 optionally includes in response to recognition of the finger motion unlock gesture, displaying, by the touchscreen computing device, a visual indication that the selected document pages are unlocked. Displaying a visual indication that the selected document pages are unlocked may be carried out by flashing one or more LEDs or lights of the touchscreen; displaying an icon somewhere on the touchscreen, providing a popup message, or any other type of indications as would occur to one of skill in the art.

Exemplary embodiments of the present invention are described largely in the context of a fully functional computer system for manipulating display of document pages on a touchscreen computing device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of manipulating display of document pages on a touchscreen computing device, the method comprising:
    recognizing, by the touchscreen computing device, finger motion selection gestures on a touchscreen of the touchscreen computing device;
    selecting, by the touchscreen computing device for each recognized finger motion selection gesture, a document page displayed on the touchscreen;
    recognizing, by the touchscreen computing device, a finger motion combination gesture on the touchscreen, wherein recognizing the finger motion combination gesture includes detecting simultaneous lifting of a plurality of fingers from the touchscreen;
    combining, by the touchscreen computing device responsive to the finger motion combination gesture, the selected document pages into a single concatenated document page; and
    displaying, by the touchscreen computing device, the single concatenated document page;
    recognizing, by the touchscreen computing device, a finger motion lock gesture on the touchscreen;
    locking, by the touchscreen computing device responsive to the finger motion lock gesture, position of the selected document pages within the single concatenated document page;
    recognizing, by the touchscreen computing device, a finger motion movement gesture on the touchscreen; and
    in response to recognition of the finger motion movement gesture when the position of the selected document pages are locked, moving, by the touchscreen computing device, the single concatenated document page.

2. The method of claim 1 further comprising:
    recognizing, by the touchscreen computing device, a finger motion rearrangement gesture on the touchscreen; and
    rearranging, by the touchscreen computing device responsive to the finger motion rearrangement gesture, positions of the selected document pages relative to each other within the single concatenated document page.

3. The method of claim 1 further comprising:
    recognizing, by the touchscreen computing device, a finger motion overlap gesture on the touchscreen; and
    overlapping, by the touchscreen computing device responsive to the finger motion overlap gesture, display of at least one of the selected document pages on at least one of the other selected document pages within the single concatenated document page.

4. The method of claim 1 further comprising in response to recognition of the finger motion lock gesture, displaying, by the touchscreen computing device, a visual indication that the selected document pages are locked.

5. The method of claim 1 further comprising:
    recognizing, by the touchscreen computing device, a finger motion unlock gesture on the touchscreen; and
    unlocking, by the touchscreen computing device responsive to the finger motion unlock gesture, position of the selected document pages within the single concatenated document page.

6. The method of claim 5 further comprising in response to recognition of the finger motion unlock gesture, displaying, by the touchscreen computing device, a visual indication that the selected document pages are unlocked.

7. The method of claim 1 wherein combining the selected document pages into a single concatenated document page includes:
    concatenating, by the touchscreen computing device, any text from the selected document pages; and
    concatenating, by the touchscreen computing device, any images from the selected document pages.

8. An apparatus for manipulating display of document pages on a touchscreen computing device, the apparatus comprising a computer processor and a computer memory operatively coupled to the computer processor, the computer memory having disposed within it computer program instructions that when executed by the computer processor cause the apparatus to carry out the steps of:
    recognizing, by the touchscreen computing device, finger motion selection gestures on a touchscreen of the touchscreen computing device;
    selecting, by the touchscreen computing device for each recognized finger motion selection gesture, a document page displayed on the touchscreen;
    recognizing, by the touchscreen computing device, a finger motion combination gesture on the touchscreen, wherein recognizing the finger motion combination gesture includes detecting simultaneous lifting of a plurality of fingers from the touchscreen;
    combining, by the touchscreen computing device responsive to the finger motion combination gesture, the selected document pages into a single concatenated document page; and
    displaying, by the touchscreen computing device, the single concatenated document page;
    recognizing, by the touchscreen computing device, a finger motion lock gesture on the touchscreen;
    locking, by the touchscreen computing device responsive to the finger motion lock gesture, position of the selected document pages within the single concatenated document page;
    recognizing, by the touchscreen computing device, a finger motion movement gesture on the touchscreen; and
    in response to recognition of the finger motion movement gesture when the position of the selected document pages are locked, moving, by the touchscreen computing device, the single concatenated document page.

9. The apparatus of claim 8 further comprising:
    recognizing, by the touchscreen computing device, a finger motion rearrangement gesture on the touchscreen; and
    rearranging, by the touchscreen computing device responsive to the finger motion rearrangement gesture, positions of the selected document pages relative to each other within the single concatenated document page.

10. The apparatus of claim 8 further comprising:
    recognizing, by the touchscreen computing device, a finger motion overlap gesture on the touchscreen; and
    overlapping, by the touchscreen computing device responsive to the finger motion overlap gesture, display of at least one of the selected document pages on at least one of the other selected document pages within the single concatenated document page.

11. The apparatus of claim 8 further comprising:
    recognizing, by the touchscreen computing device, a finger motion unlock gesture on the touchscreen; and
    unlocking, by the touchscreen computing device responsive to the finger motion unlock gesture, position of the selected document pages within the single concatenated document page.

12. The apparatus of claim 8 wherein combining the selected document pages into a single concatenated document page includes:
    concatenating, by the touchscreen computing device, any text from the selected document pages; and
    concatenating, by the touchscreen computing device, any images from the selected document pages.

13. A computer program product for manipulating display of document pages on a touchscreen computing device, the computer program product disposed upon a computer readable non-transitory storage medium, the computer program product comprising computer program instructions capable, when executed, of causing a computer to carry out the steps of:

recognizing, by the touchscreen computing device, finger motion selection gestures on a touchscreen of the touchscreen computing device;

selecting, by the touchscreen computing device for each recognized finger motion selection gesture, a document page displayed on the touchscreen;

recognizing, by the touchscreen computing device, a finger motion combination gesture on the touchscreen, wherein recognizing the finger motion combination gesture includes detecting simultaneous lifting of a plurality of fingers from the touchscreen;

combining, by the touchscreen computing device responsive to the finger motion combination gesture, the selected document pages into a single concatenated document page; and displaying, by the touchscreen computing device, the single concatenated document page;

recognizing, by the touchscreen computing device, a finger motion lock gesture on the touchscreen;

locking, by the touchscreen computing device responsive to the finger motion lock gesture, position of the selected document pages within the single concatenated document page;

recognizing, by the touchscreen computing device, a finger motion movement gesture on the touchscreen; and in response to recognition of the finger motion movement gesture when the position of the selected document pages are locked, moving, by the touchscreen computing device, the single concatenated document page.

14. The computer program product of claim 13 further comprising:

recognizing, by the touchscreen computing device, a finger motion rearrangement gesture on the touchscreen; and rearranging, by the touchscreen computing device responsive to the finger motion rearrangement gesture, positions of the selected document pages relative to each other within the single concatenated document page.

15. The computer program product of claim 13 further comprising:

recognizing, by the touchscreen computing device, a finger motion overlap gesture on the touchscreen; and overlapping, by the touchscreen computing device responsive to the finger motion overlap gesture, display of at least one of the selected document pages on at least one of the other selected document pages within the single concatenated document page.

16. The computer program product of claim 13 further comprising:

recognizing, by the touchscreen computing device, a finger motion unlock gesture on the touchscreen; and unlocking, by the touchscreen computing device responsive to the finger motion unlock gesture, position of the selected document pages within the single concatenated document page.

17. The computer program product of claim 13 wherein combining the selected document pages into a single concatenated document page includes:

concatenating, by the touchscreen computing device, any text from the selected document pages; and concatenating, by the touchscreen computing device, any images from the selected document pages.

* * * * *